United States Patent [19]
Gerritsen et al.

[11] Patent Number: 6,028,721
[45] Date of Patent: Feb. 22, 2000

[54] APPARATUS FOR CONFORMAL IDENTIFICATION OF STARS AND OTHER DISTANT OBJECTS

[75] Inventors: Hendrik J. Gerritsen, Providence, R.I.; Aaron O. Schweiger, Ashland, Oreg.

[73] Assignee: Brown University Research Foundation, Providence, R.I.

[21] Appl. No.: 09/162,545

[22] Filed: Sep. 29, 1998

Related U.S. Application Data

[60] Provisional application No. 60/060,362, Sep. 29, 1997.

[51] Int. Cl.$^7$ ................................................ G02B 27/02
[52] U.S. Cl. ................................................ 359/800; 359/802
[58] Field of Search ........................ 359/800, 801, 359/802, 803, 804, 819, 822, 823

[56] References Cited

U.S. PATENT DOCUMENTS

| | | | |
|---|---|---|---|
| 4,244,651 | 1/1981 | Roof | 356/142 |
| 4,312,577 | 1/1982 | Fitzgerald | 353/12 |
| 4,887,250 | 12/1989 | Vuarnesson | 368/15 |
| 5,003,698 | 4/1991 | Vuarnesson | 33/268 |
| 5,311,203 | 5/1994 | Norton | 345/7 |
| 5,649,827 | 7/1997 | Suzaki | 434/284 |

OTHER PUBLICATIONS

J.B. Caplan and H.J. Gerritsen, "Imaging the Stars: Two Approaches to the Development of a Holographic Star Chart," SPIE Porceedings, Practical Holography X, 2652, pp. 266–275, 1996.

Star Finder Discover the Universe Book, Astronomical Society of the Pacific, 1996.

Frederick Pearson, II, Map Projections Theory and Applications, CRC Company, 1990.

*Primary Examiner*—Georgia Epps
*Assistant Examiner*—Ricky Mack
*Attorney, Agent, or Firm*—Wolf, Greenfield & Sacks, P.C.

[57] ABSTRACT

A conformal identification apparatus is disclosed. The apparatus presents to an observer through an aided eye at least first and second representational objects corresponding to first and second actual objects. The apparatus includes a map that contains the first and second representational objects; a magnifier disposed between the map and the aided eye that presents a magnified image of a portion of the map including the first and second representational objects; and a support structure that supports the map and the magnifier. The apparatus enables the observer to view the first and second actual objects through an unaided eye simultaneously with viewing the magnified image with the aided eye. The magnifier has a focal plane and has a magnification determined so that, when the map is positioned approximately at the focal plane, an angle observable by the aided eye between the first and second representational objects is approximately the same as an angle observable by the unaided eye between the first and second actual objects. The map may be celestial and the apparatus may be used to identify stars, constellations, and other celestial objects.

36 Claims, 4 Drawing Sheets

APPARATUS FOR CONFORMAL IDENTIFICATION OF STARS AND OTHER DISTANT OBJECTS

RELATED APPLICATION

This application claims the benefit of U.S. Provisional Application No. 60/060,362, filed Sep. 29, 1997.

BACKGROUND OF THE INVENTION

1. Field of The Invention

The present invention relates generally to optical instruments for identifying groups of distant objects and, more particularly, to instruments for optically identifying constellations of stars by comparing their position and shape to representations of stars on a chart.

2. Related Art

The grouping of stars into named constellations is thousands of years old. For at least two thousand years, star charts have been used to assist in identifying constellations. One such early chart is the astrolabe. It has been used to determine one's location on the Earth and to learn to identify constellations and individual stars in them. Most modern star charts are simplifications of the ancient astrolabe, and have various names such as planisphere, star locator, and so on. These charts consist essentially of representations of stars from the visible sky as projected onto a flat disk. In some cases, a device is employed to adjust a display of the chart so that it shows the visible stars from a particular location at a particular time of year. This adjustment is done, for example, by viewing a generalized star chart through an elliptical window, the aperture of which shows the stars visible above the horizon at a particular time of night and day of the year. Such a chart typically is made to rotate around the celestial North or South Pole.

One common type of chart, related to the above mentioned adjustable ones, is called a zenith map. Zenith maps consist of a flat (usually azimuthal equidistant) projection of the starry hemisphere for a particular latitude on Earth and time of the year. The zenith is the center of the chart, and the horizon is portrayed as an outer circle around the zenith. Twelve such charts, one for each month, typically are deemed sufficient to serve through the year. Zenith maps have considerably less distortion than the projections used in the more generalized planisphere type star charts.

Notwithstanding the availability of zenith maps and other types of star charts, there are significant disadvantages to using them for learning the constellations, individual stars, and other astronomical subjects. According to a traditional technique, one looks at a star chart and then shifts focus to the sky in order to attempt to find the corresponding celestial subjects. Often, however, it is not clear if a subject found in the sky corresponds with a subject appearing on the chart. This difficulty occurs because it is necessary to continually shift attention between the chart and the stars in the sky and, typically, constellations as shown on the chart may not be the same size, or in the same orientation, as patterns of stars in the sky. Also, it typically is necessary to illuminate the star chart so that it may be seen at night. The illuminated star chart thus is usually significantly brighter than the sky. It therefore typically is necessary for the observer's eyes continually to adjust between the brighter light of the star chart and the dimmer light of the night sky. This adjustment introduces delay and makes it more difficult to relocate the group of stars that were being observed. Thus, this traditional procedure is discouraging to many.

Devices have been developed for the purpose of allowing a user to compare stars in the sky to a star chart without continually shifting attention between the sky and the chart. One type of such devices may be referred to as "binocular superposition" devices, an example of which is described in J. B. Caplan and H. J. Gerritsen, "Imaging the stars: two approaches to the development of a holographic star chart," *SPIE Proceedings, Practical Holography X*, 2652, pages 266–275 (1996) (hereafter referred to as "Caplan and Gerritsen"). The term "binocular" is employed to indicate that both eyes simultaneously are used to look through the device. In the device described in Caplan and Gerritsen, an observer uses both eyes to look at the sky through a beamsplitter. The beamsplitter combines images from a star chart and the night sky. By moving the star chart, the observer tries to obtain a superposition of the real sky and the map images.

There are serious disadvantages, however, to this approach. Using known holographic designs, the device described in Caplan and Gerritsen is relatively expensive and heavy. Obviously, the weight of such a device is important since it typically will be held by an observer for significant periods of time, and often at angles (such as when viewing near the zenith, for example) that make holding awkward or difficult. Significantly, the holographic device described in Caplan and Gerritsen also typically is limited to observing approximately a 20 degree portion of the sky. Such a restricted view limits the application of the device to perhaps one small constellation at a time.

Another type of binocular approach is described in Ben Mayer, *Starwatch*, Perigee Books, The Putnam Publishing Group, (1984), page 17, significant aspects of which appear to be incorporated in a product called "Star Finder" made by ALPI International, Oakland, Calif. The author describes painting stars as fluorescent dots on a transparent sheet. The observer attempts to superimpose these dots with real stars by holding the sheet at arms length and adjusting its direction and orientation. Using a sheet that is of a size and weight comfortable to hold at arms length, only a small portion of the sky may be represented on the sheet. Typically, this approach thus allows the study of only one constellation at a time. It therefore is not possible to move smoothly from one constellation to the next, because separate sheets must be used. Also, unless one views the constellations with only one eye, parallax problems result. That is, if one eye sees a star on the sheet superimposed with a star in the sky, the other eye sees that same star on the sheet superimposed with a totally different part of the sky, typically making an angle of about six degrees with the first direction. In addition it is difficult to adjust one's focus (so called accommodation) between the stars. Moreover, some people find that holding one's eye shut, or using a patch, for the length of time needed to locate a constellation is confining and uncomfortable.

U.S. Pat. No. 5,649,827 to Suzaki describes a large device, including a dome, in which the problems of parallax and accommodation appear to be ameliorated due to the larger distances involved. However, this device is not portable. The patterns are projected on the dome by a laser rather than being afixed to the dome.

A monocular device is also known that, like the device of Caplan and Gerritsen, employs a type of beamsplitter to join two images. However, it retains some of the disadvantages noted with respect to Caplan and Gerritsen: in particular, it is relatively heavy and may be relatively expensive. U.S. Pat. No. 5,311,203 to Norton, et al. describes a monocular instrument through which an observer may observe two images through one eye. One image is of subjects in the field of view of the instrument, such as stars in the sky. The other image is of an electronically generated reference display. These two images are joined by a beamsplitter so that a superimposed image is created. Light from the combined image then follows a common path to the observer's eye. (See, e.g., column 3, lines 40–55.) Thus, parallax problems are avoided, but the observer must hold the instrument containing the beamsplitter, electronics for generating the reference display, and other elements, such as positions sensors.

Yet another known type of monocular device presents a map of celestial subjects to one eye, but has serious disadvantages if one attempts to use it to correlate subjects seen on the map with subjects in the sky. This type of device is described in U.S. Pat. No. 5,003,698 to Vuarnesson, and aspects of the described device are included in a product called "Cosmic," also called "Stellarscope", that is produced by Sculptures-Jeux of Paris, France. The Cosmic device uses a small star map in which the stars are transparent dots on a black background. This map may be viewed with one eye with the use of a low magnification lens. The device portrays all of the visible stars in a single view. Thus, the angle between representations of any two given stars as viewed through the device is much smaller than the angle between the corresponding stars as viewed in the sky. Consequently, the representational stars appear to be much closer together than the actual stars in terms of angles. Thus, it may be difficult to correlate representational star patterns with actual star patterns.

Therefore, what is needed is a relatively light and inexpensive device for enabling an observer conveniently and reliably to identify distant subjects, such as stars, by comparing them with representations of those subjects, such as represented on a star map.

SUMMARY OF THE INVENTION

The present invention is a device for conformal identification of distant, actual, objects. The term "actual object" will be understood to refer herein to a subject, such as a star or a distant terrestrial feature, that is represented by a "representational object." Thus, for example, a group of stars, such as a constellation, constitute a group of actual objects (stars) that are represented by a corresponding group of representational objects, such as dots on a map. That is, each representational dot represents an actual star in this illustrative example. The dots may be various sizes depending, for example, on the brightness of the stars they represent. The size of the dots may also vary to include possible distortion or uncertainty in their placement on a map.

While the properties and advantages of the present invention are generally described hereafter with respect to the identification of celestial objects, in particular, constellations of stars, it will be understood that the invention is not so limited. The invention generally may be applied, as noted, to identify any group of distant objects. Typically, the objects to be identified are distant so that the angles among them are relatively fixed; i.e., those angles do not significantly depend on the distance from the observer to the objects.

In one embodiment, a conformal constellation identifier is described. The word "conformal" refers to the property of the device that, when properly aligned, it provides to an observer representational star images that conform with (i.e., are superimposable upon) corresponding real stars in the sky. In addition, the representational star image is provided to one eye at the same time as the observer's other eye unobstructedly views the corresponding real star image. Moreover, the angles and orientations among representational stars as seen by one eye are approximately the same as the corresponding angles and orientations among the corresponding actual stars as seen by the other eye. To make this possible, there is a strict relationship between the magnification (or focal length where, for instance, a magnification of 20 times corresponds to a focal length of 25/20 centimeters=1.25 centimeters) and the scale of the map. For example, for two stars in the sky for which the angle between them is 10 degrees, and in order to appear conformal, the distance between the stars on the star chart under 20-times magnification equals 1.25 centimeters times the tangent of 10 degrees=2.2 millimeters. Thus, the two images are effectively "fused" by the observer's brain; that is, they are approximately superimposed and appear as approximately a single image. When such a fusion occurs, the observer may identify the actual stars merely by noting the identity of the representational stars. The representational stars typically have identifying labels associated with them for this purpose.

In some embodiments, the invention may be binocular rather than monocular. It is possible in a portable, conformal, binocular device in accordance with the present invention to overcome the problems of parallax and accommodation noted above with respect to known devices. In particular, a magnifier lens is placed between a small star chart and a nondistorting beamsplitter. In that case, the observer sees the night sky stars directly through the beamsplitter. Simultaneously the reflection by the beamsplitter presents the viewer with parallel, parallax free light from the star images on the star chart, which is placed at the focal plane of the magnifier. These images are then superimposable on the directly viewed stars.

The star chart may, but need not, be flat. For example, the star chart could be a miniature of the celestial globe, properly mirror-imaged in the horizontal direction. Such mirror-imaging typically is necessary because the projected images present an outside view, while the direct view of the celestial vault is from the inside. Observing different areas of the sky consecutively can then be accomplished by two dimensional rotation of the small celestial sphere. This rotation could be accomplished in accordance with a variety of known techniques such as is done, for example, with a tracking ball in a computer mouse. A device in accordance with the invention and using a miniature celestial globe has the added advantage of being applicable anywhere in the world.

As far as the beamsplitter is concerned, it may, but need not, be a flat piece of transparent material. For example, it could include two parallel curved surfaces so that the reflection would come from a concave type mirror. In that case, the beamsplitter is part of the magnifier. All of the features of binocular embodiments may equally be employed in monocular embodiments. The principal difference is that, in a monocular embodiment, the beamsplitter typically is omitted. Omitting the beamsplitter has the advantage of allowing a shorter distance between the observer's eye and the magnifier, thus facilitating larger viewing angles. For clarity and convenience, embodiments of the invention hereafter are described in terms of monocular embodiments unless otherwise specified. It will be understood, however, that the invention is not so limited.

The invention has the advantage of enabling the observer to identify constellations simply by holding the invention to one eye (sometimes referred to as the "aided" eye), while observing the sky with the other eye (sometimes referred to as the "unaided" eye), and moving the head until the images from the two eyes fuse. Thus, the observer's attention is not diverted and there is no need to adjust to different lighting conditions with respect to a star chart and the sky.

The term "unaided eye" is used herein for clarity and convenience with respect to monocular embodiments to refer to the eye that is looking at the actual objects, rather than the eye that is looking at representational objects presented through the device of the invention. However, it will be understood that the unaided eye may be aided by various optical devices such as ordinary corrective glasses, by a telescope or other magnifier, and so on.

Typically, but not necessarily, the observer's head movement undertaken to fuse the two images is not random. Rather, this movement is led by the unaided eye, which follows a line of vision starting from a known object (such as a known star or constellation) and moves in a direction suggested by the image in the aided eye. For example, the observer may recognize in the sky the constellations Ursa Major, Ursa Minor, and Draco, and superimpose them with the representational image of those constellations presented by the invention. The observer may then note from the image presented by the invention the direction from these constellations to other nearby stars or constellations. With reference to this illustrative example, the observer may note from the image presented by the invention the direction, relative to the recognized stars, of the constellations Bootes, Virgo and also the Summer Triangle formed by the stars Deneb, Vega and Altair. The observer then may shift attention in the sky, following an indicated direction until one or more of these nearby objects are superimposed on the corresponding representational objects.

Once a fusion of images has occurred, the observer may conveniently be presented with a range of information about the identified constellation. This information may be included with the representational image presented to one of the observer's eyes. For instance, the names and outlines of the constellations; the identities and properties of notable stars, nebulae, or other features of the constellations; and other educational information, may be presented. Learning the names given to certain constellations and the stars in them generally is easier and more enjoyable if those names are presented to the observer simultaneously with the observer's viewing of those objects.

As noted, the present invention is implemented in some embodiments as a monocular device. The term "monocular" is used because only one eye looks through the device at a fraction of a map of the sky. The other eye simultaneously looks directly at the sky; i.e., it does not look at the sky through the device. Advantageously, such a monocular device is typically inexpensive to implement and lightweight, mainly because the eye looking through the device needs only to receive parallel light. This requirement is easily met with a short focal length lens having the representational star images at its focus. Fortunately, because of the mature development and wide usage of optical lenses of this type, good optical quality may be obtained at relatively low cost. Also advantageously, because only one eye is involved in viewing through the device, there is no problem with parallax.

A further advantage of a constellation finder in accordance with the present invention is that the observer may readily examine large portions of the sky. As described below, the observer may translate and rotate the star map so that different portions of it are magnified and presented to the eye looking through the device. Thus, by continuously adjusting the device while examining regions of the sky with the other eye, the observer may scan the sky in order quickly to become familiar with its features.

Yet a further advantage of the present invention is that it may be used in conjunction with other optical devices. With respect to a celestial embodiment of the invention, for example, the device may be used in conjunction with other astronomical devices, such as a telescope or monocular. While one eye would observe the night sky through the telescope or monocular, the other would look into the device at a star chart that corresponds to the magnified view provided by the telescope or monocular. That is, the star chart and magnifier in accordance with the invention would have appropriately chosen scale and magnification, respectively. Also, the star chart might include labels describing information of interest or significance to one observing such a magnified view, and might be oriented to conform to the orientation provided by the telescope or monocular. (Such labels, or other information-bearing marks such as lines connecting stars in a constellation, are collectively referred to herein for convenience as "information marks.") An observer would be able to superimpose the magnified images of the sky received by one eye through the telescope or monocular with the view of the star chart provided by the device of the invention. Such a device might thus be used to examine the features of the moon, double stars, galaxies, and other celestial bodies observable through the other optical instrument.

In one embodiment, the invention is a conformal identification apparatus that enables an observer to view through a first visual path at least first and second representational objects corresponding to first and second actual objects. The apparatus includes a map, disposed within the first visual path, that includes first and second representational objects; a magnifier, also diposed within the first visual path, that magnifies a portion of the map including the first and second representational objects; and a support structure that supports the map and the magnifier. The apparatus enables the observer to view the first and second actual objects with respect to a second visual path simultaneously with viewing the magnified image with respect to the first visual path. The magnifier has a focal plane and has a magnification determined so that, when the map is positioned approximately at the focal plane, an angle between the first and second representational objects as observable with respect to the first visual path is approximately the same as an angle between the first and second actual objects as observable with respect to the second visual path. The map may be celestial or terrestrial objects. In one implementation, the support structure enables the map to be moved at the focal plane of the magnifier.

In other embodiments, the invention is a conformal identification apparatus. The apparatus includes magnifying means for magnifying a portion of a reference image that represents an actual image; focusing means for varying the focal length of the magnifying means; and positioning means for varying the position of the reference image with respect to the magnifying means. In these embodiments, the magnified portion of the reference image, when presented to at least a first eye of an observer, is visually superimposed on the actual image as viewed simultaneously by the observer.

BRIEF DESCRIPTION OF THE DRAWINGS

The above and further advantages of the invention will be more clearly appreciated from the following detailed description when taken in conjunction with the accompanying drawings, in which like reference numerals indicate like structures, and wherein.

DETAILED DESCRIPTION

Figure 1A:
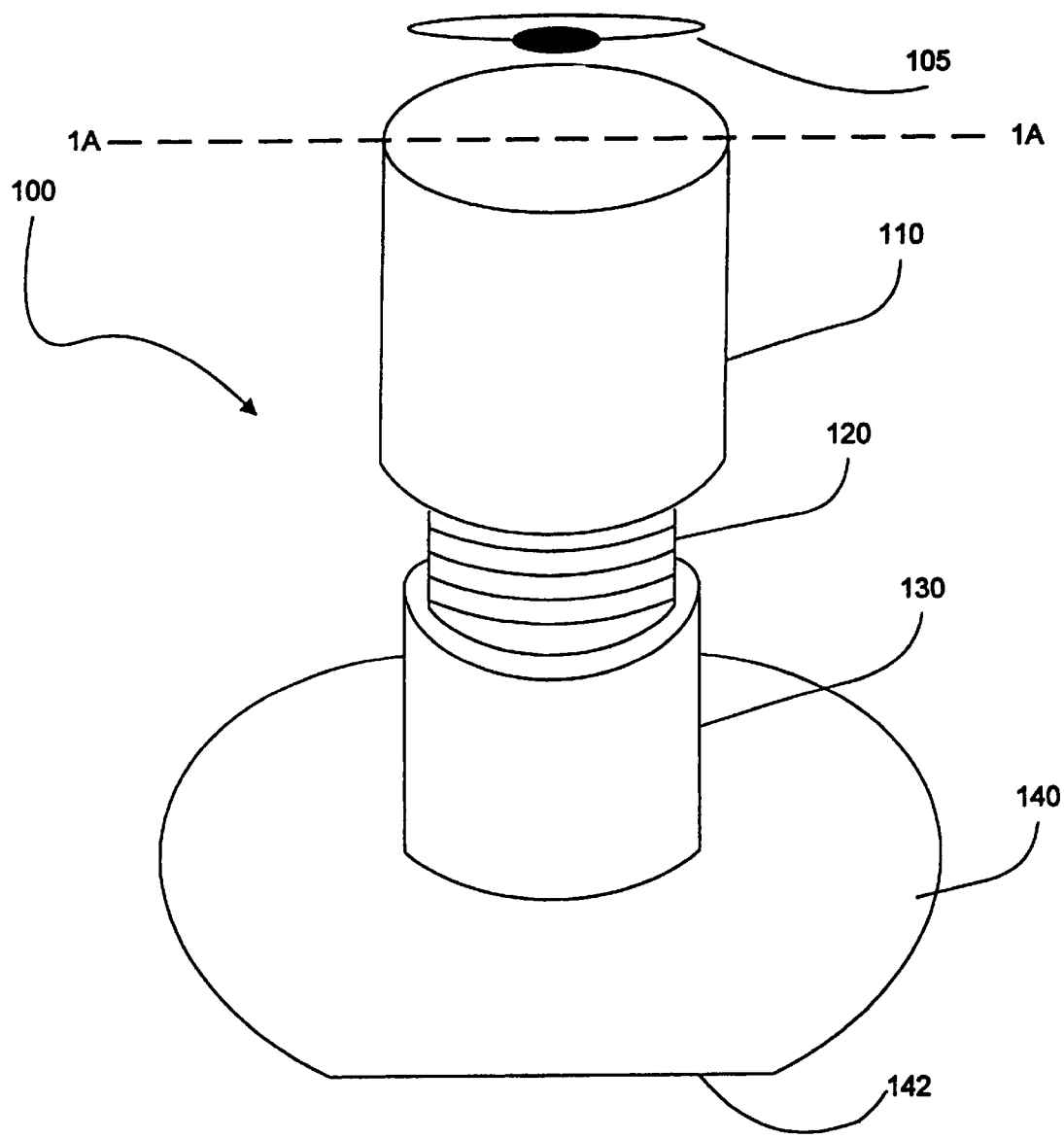
FIG. 1A is a perspective view of one embodiment of the present invention.
Figure 1B:
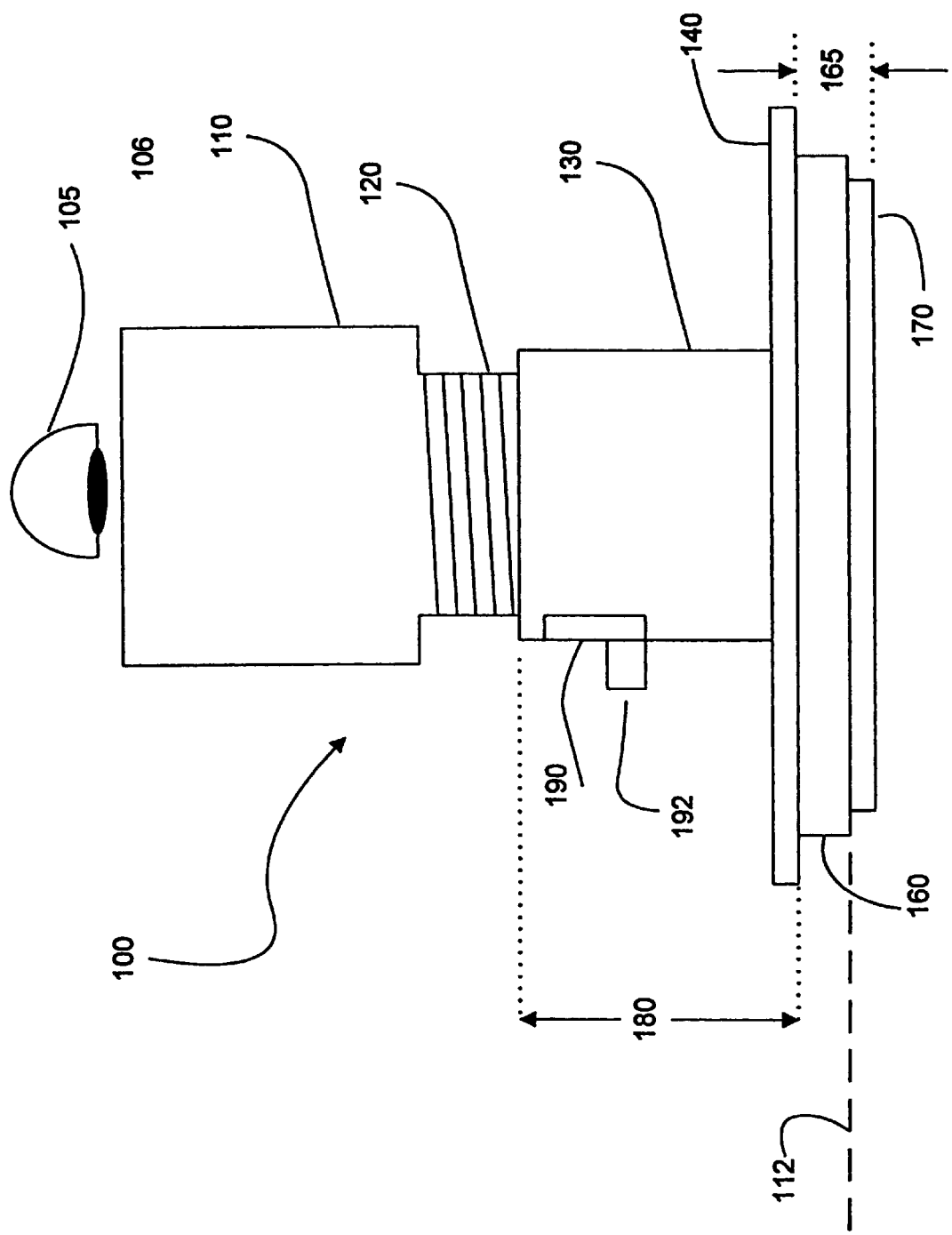
FIG. 1B is a side view of the invention of FIG. 1A.
Figure 1C:
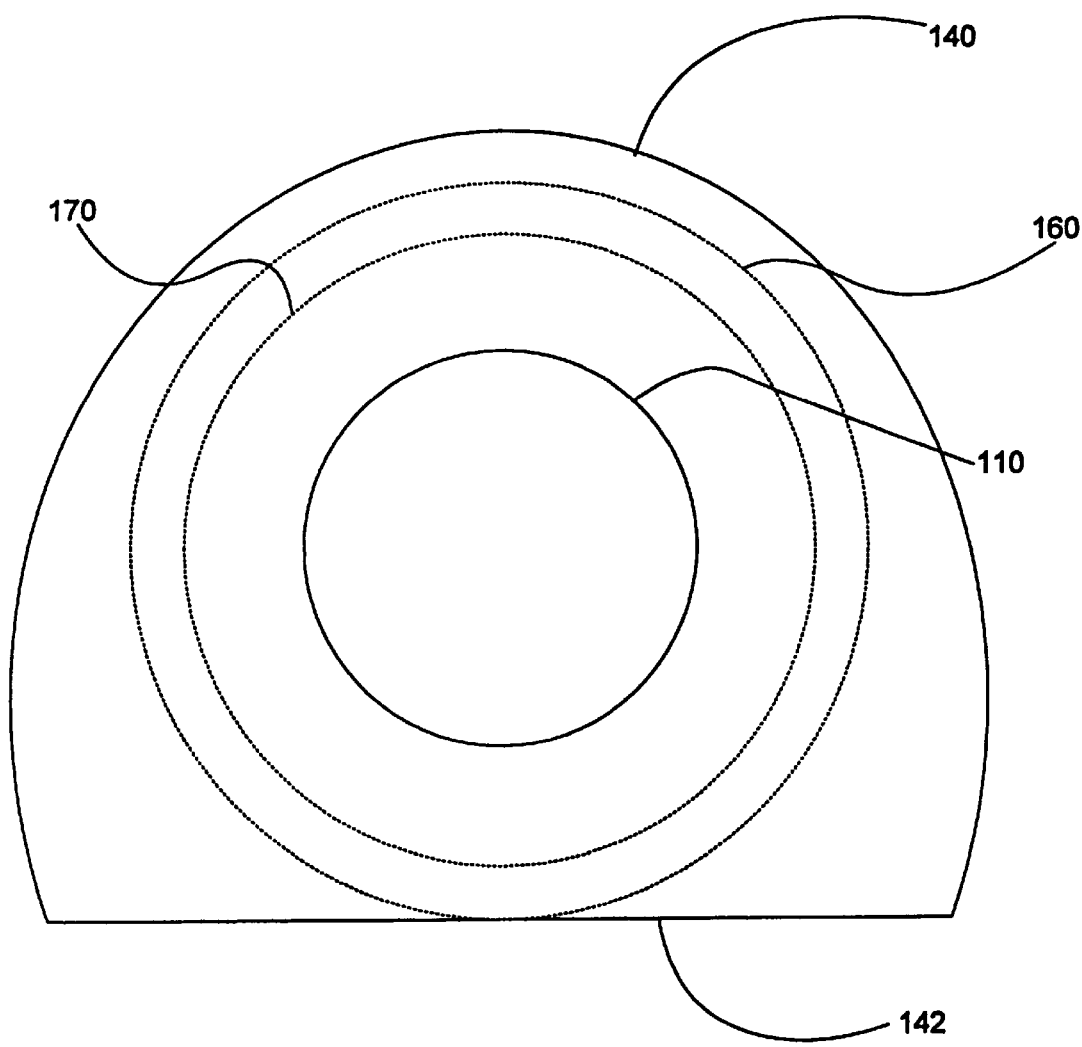
FIG. 1C is a top view of the invention of FIGS. 1A and 1B.

The attributes of the present invention and its underlying architecture will now be described in greater detail with reference to one embodiment of the invention, referred to as conformal star constellation identifier 100, or simply identifier 100. FIGS. 1A–1C, which are not necessarily drawn to scale, respectively show perspective, side, and top views of identifier 100. Identifier 100 provides a magnified image of a selectable portion of a conforming star map to one eye of an observer. The term "conforming star map" means that the angles and orientations among representational stars on the map, when so provided to the observer, are approximately the same as the angles and orientations among the actual stars they represent, as viewed by the observer. Illustrative conforming star map 170 is shown schematically in FIGS. 1A–1C, and is also shown in simplified graphical form in FIG. 2. In the illustrated embodiment, map 170 is part of map assembly 165. In addition to map assembly 165, identifier 100 includes magnifier 110 and support structure 180. Each of these exemplary components, and their parts, are now described with reference to FIGS. 1A–1C, and 2. Although the illustrated embodiment is a monocular device using flat maps, one for each month, it will be understood that the invention is not so restricted. Other maps (that may, as noted, be viewed through binocular embodiments of the present invention) are possible that provide two conformal images, one of which being the direct view of the distant objects and the other being a view of the map as provided by the invention. Typically, the map may be rotated and/or translated for consecutive viewing.

MAGNIFIER 110 AND MAP 170

The ability of identifier 100 to provide a conformal image to an observer is achieved in part by providing a proper relationship between the magnification of magnifier 110 and the scale of map 170. In particular, this relationship is such that the angles and orientations among stars on map 170 approximately match those in the sky. For example, the angle observed with identifier 100 between the star α in Ursa Major (the Big Dipper) and the star Polaris must closely match the observed angle of 28 degrees between these stars in the sky. In order to provide the observer with approximately parallel light from identifier 100 so that the image appears at infinity to the observer's eye 105, as do the stars to the other eye, map 170 typically is located in the focal plane of magnifier 110.

The relative positioning, and sizes, of magnifier 110 and map 170 are also typically constrained by the need to provide the observer with an unobstructed view to the eye used for viewing the sky directly. That is, identifier 100 is sufficiently small so as not to block the unaided eye's view of the sky. For the same reason, the identifier typically is placed close to the observer's eye. This need to avoid obstruction of the unaided eye typically requires that map 170 have a maximum diameter of about seven centimeters. This maximum is based on typical facial characteristics (e.g., a usual distance between two eyes in an adult), and a typical length of identifier 100. It will be understood that the typical facial characteristics used in determining the maximum diameter of map 170 may vary depending upon the intended users. For example, identifier 100 may be designed to be used by children, in which case the eyes typically are closer together than in an adult, and identifier 100 therefore typically is smaller and the maximum diameter of map 170 is smaller. The length of identifier 100 depends on the dimensions of magnifier 110, support structure 180, and map assembly 165. Thus, magnifier 110 typically is relatively small, but, at the same time, must have strong magnification so that it may generate conformal angles between representational stars on map 170 notwithstanding the typically small diameter of map 170. Also, it generally is desirable that magnifier 110 provide a large field of view so that the observer may readily make associations between celestial objects with a single glance at the sky.

In one illustrative embodiment of identifier 100, map 170 may be a flat disk having a diameter of 4.5 centimeters. Included on this disk are representational stars covering portions, or the entirety, of the visible night sky at a certain time of year from a certain latitude. Maps that include the entire sky generally are larger than those covering only a portion, and thus, to prevent obstruction of the unaided eye, generally require that identifier 100 be shorter and magnifier 110 provide greater magnification (since representational stars will be packed more closely together). Alternatively, such full-sky maps may be made smaller, but may thus introduce greater distortion in the image presented to the aided eye depending (as is well known to those skilled in the relevant art) on such factors as the resolution of the map and the optical characteristics of magnifier 110. Also, various versions of map 170 typically are constructed that portray the night sky at varying times of the year (for example, for each month), at various latitudes (for example, highly populated latitudes in the northern and southern hemispheres).

Applying the constraints described above with respect to typical facial characteristics and overall length of identifier 100, and assuming a map diameter of 4.5 centimeters, it may readily be determined in accordance with techniques known to those skilled in the relevant art that magnifier 110 should have a magnification of approximately 22 times. If a lower power magnifier were used, for example one having a magnification of ten times, the scale of the map would then have to be larger in order to be conformal. This larger size map could, depending on the facial characteristics of the observer, obstruct the observer's view through the unaided eye. The use of a much stronger magnifier, such as one having a magnification of 30 or 40 times, would have the advantage of permitting the use of a smaller map and thus avoid obstructing the view of the unaided eye. However, higher magnification generally is more expensive, requires a closer tolerance on focussing, and may have a smaller field of view. A magnification of about 22 times represents one appropriate compromise between providing good resolution at low cost and low weight while at the same time avoiding obstruction. However, as described below, a cut is made in this illustrative embodiment in map assembly mounting member 140, which generally is larger than map 170, in order to avoid obstructing the observer's unaided eye.

A variety of available magnifiers may thus be used in various embodiments. In the illustrative embodiment, magnifier 110 is a Peak Loupe 22-times magnification, 3 component, 4-element, coated achromatic magnifier, available from, among others, Edmund Scientific Company. This loupe is of high optical quality, and is light. It has a focal length of approximately 250/22 mm=11.4 millimeters. In this exemplary implementation, focusing support member 130 is approximately one centimeter in length, and threaded portion 120 of magnifier 110 is approximately five millimeters in length. These lengths allow for variation in the focal length by about plus or minus 20 percent. This variation typically is sufficient to correct for variations in map position and in individual eye strength. The illustrative magnifier has a field of view of about 45 degrees (total cone angle), thus it may be superimposed on a 45 degrees portion of the sky. This field of view easily incorporates the approximately five degree angle between the "pointer stars" in the Big Dipper, Dubhe and Merak. It also incorporates the approximately 34 degree angle between the stars Merak and Polaris. Using these illustrative components, representations of the stars Merak and Polaris are separated by a distance of approximately eight millimeters on map 170.

A large field of view, such as the 45 degree field of view of the illustrative example, is desirable because it permits the observer to observe adjacent constellations and to move smoothly from one constellation to the next. Because the view is restricted to approximately 45 degrees, however, the observer obviously can not observe a representation of the entire sky at once. Rather, as described below, map 170 is moved by the observer so that successive 45-degree portions of map 170 are presented to the aided eye. That is, map 170 in this illustrative embodiment includes representations of stars covering the entire visible sky (i.e., above the horizon). Its position and orientation with respect to magnifier 110 may then be changed by the observer so that the portion of map 170 being magnified suitably matches the portion of the real sky being observed by the observer. The observer may thus shift attention to corresponding 45-degree portions of the sky. The observer's gaze may therefore move along the sky from one constellation identified with the aid of identifier 100 to the next configuration of stars, while simultaneously moving map 170 in a corresponding manner. This next configuration of stars may then be identified by noting its superposition with another group of representational celestial objects, e.g., another constellation, on map 170. That is, the image of the configuration of stars viewed by the unaided eye "fuses" with the image of representational objects on map 170. Thus, identifier 100 may be used to identify objects anywhere in the sky.

In order for the representational objects on map 170 (e.g., representations of stars in constellations), as well as information marks, to be visible, it generally is necessary to illuminate them. Artificial illumination may be provided, as described below with respect to active illuminator 190. Such artificially illuminated objects or information marks may therefore be referred to as "actively illuminatable representational objects." However, star light alone (or another ambient light source, also referred to herein as "passive illumination") may also be used to back light map 170 if the representational stars and information marks are transparent on a black (or opaque) background. The starlight itself typically is bright enough to provide backlighting for the transparency, particularly if it is slightly scattered by a diffusing element (not shown) in contact with map 170. Moreover, combinations of active and passive illumination may be used with specially designed maps. For example, reflective patterns on the front of the map may be illuminated with the active illumination, while transparent parts might be passively back lit with star light. Thus, the observer may select the level of information simultaneously portrayed.

Figure 2:
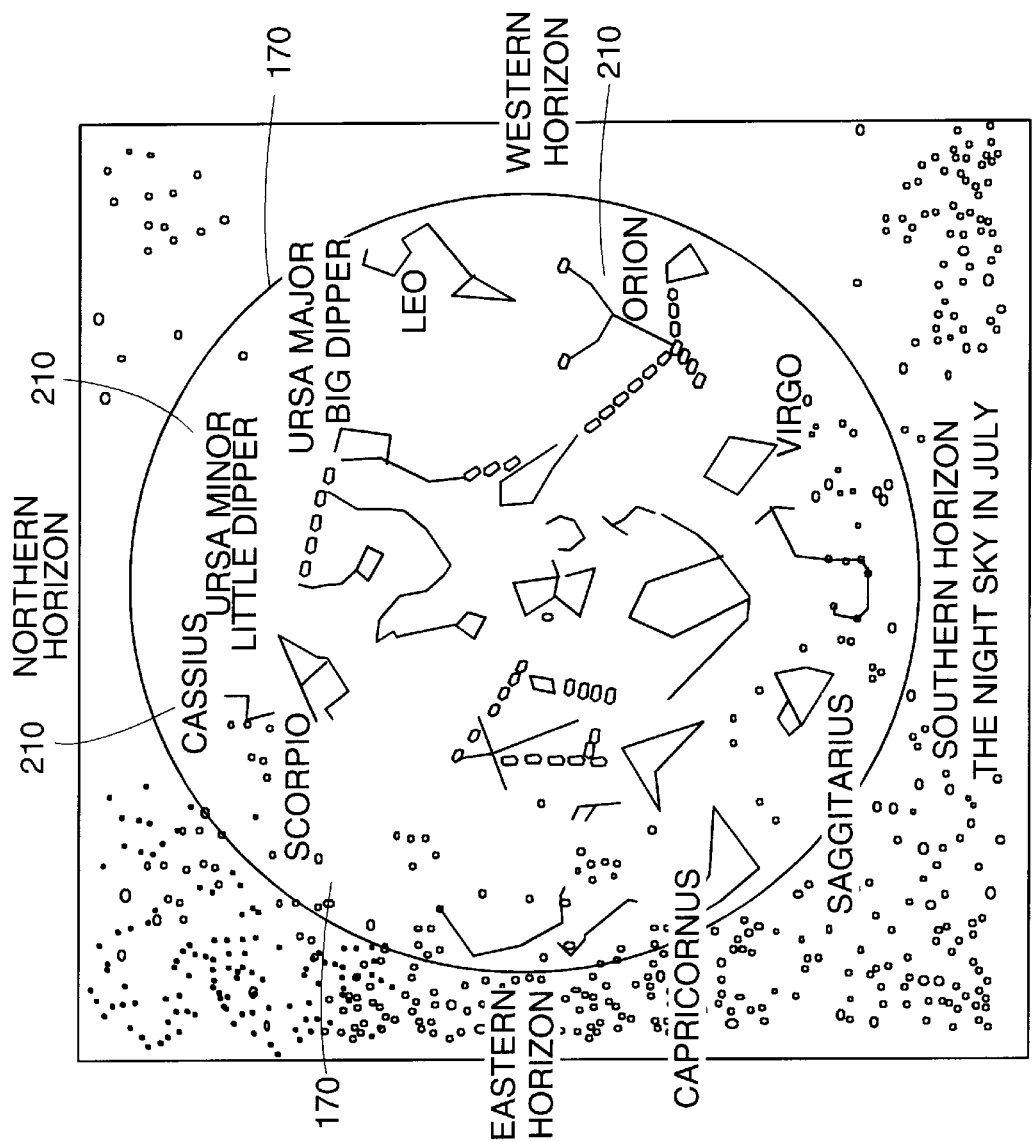
FIG. 2 is one embodiment of a map of the invention of FIGS. 1A–1C.

As noted, FIG. 2 is a graphical representation of one implementation of map 170 that may be used in accordance with the illustrated embodiment. It is not necessarily shown to scale and, as noted, represents a map of approximately 4.5 centimeters in diameter. (FIG. 2 shows a square transparency with a black background, but map 170 is the circular area within the square transparency.) Various representational objects and informational marks 210 are included in map 170 of FIG. 2, such as stars within constellations, lines connecting such stars, names of constellations, orientation indications such as "southern hemisphere," and so on.

The map of FIG. 2 is one form of a conventional, azimuthal equidistant projection star map appropriate for use in the month of July at a latitude of approximately 40 degrees Northern latitude. As also noted, the map of FIG. 2 consists of transparent stars on a black background. Such representational stars may be produced photographically, created using a variable reducing copy machine with overhead transparency sheets, or in other ways. The photographic method, while generally more expensive, typically creates higher quality images.

Zenith maps using an azimuthal equidistant projection generally provide acceptable representations of angles between representational stars located near the zenith. Typically, however, these maps introduce distortion with respect to stars of lower altitude. Therefore, in one embodiment, the present invention employs flat maps using gnomonic projections, described below. In particular, composite gnomonic maps are used to minimize distortions in regions of interest. In such maps, the minimum dot size used to represent the least bright stars typically would be equal to the largest error when examining a region of the sky containing that star. As noted, another approach to reducing distortion employs the use of curved maps, i.e., miniature celestial globes or parts thereof.

The reason for the distortion at lower altitudes in a zenith projection may be appreciated from the following remarks. As noted, a zenith projection is a flat chart with the zenith as center and the horizon as an outer circle. Stars making an angle of $a°$ with the horizon, or $(90-a)°$ with the zenith, are projected on a radius pointing to whatever compass direction, or azimuth, the star has. They are located a fraction $(90-a)/90$ of the radius from the zenith. In the radial direction, there is no error between this position of the star on the flat map and on the celestial sphere. The radius of the map corresponds to a 90 degree vertical angle. However, along the horizon, circles at 90 degree angles, as between north and west, do not correspond to the radius, but to $\pi/2$ times the radius, or about 1.57 of the radius. This stretching-out factor diminishes rapidly going toward the zenith. In reality, of course, the angels between stars in a constellation remain constant, regardless of the altitude of the constellation. These constant angles correspond to the angles which the constellation would show when in zenith. That "true" projection is what is referred to herein as a gnomonic projection. As calculated above, the error for a horizontal length of one, for various values of altitude "a" in degrees, may be represented by:

$$\frac{\text{distance on starchart} - \text{distance on celestial sphere}}{\text{distance on celestial sphere}}$$

along the horizon. Consider a star on the celestial sphere, with radius R which has an altitude $a°$. On the flat map this star will be located a distance of $R(90°-a) \pi/180$ from the zenith, namely the arc from the zenith along the celestial globe to the star which has an altitude a°. The circumference of a circle with that radius is, on the map, $R(90°-a) \pi^2/90$. The circumference of a circle through that star around the zenith on the celestial sphere, however, is $2\pi R \cos \alpha$. Thus the error, the fraction by which the real circumference has been stretched on the flat map, is:

$$\frac{\frac{\pi^2}{90}(90°-a)R - 2\pi R \cos\alpha}{2\pi R \cos\alpha} = \frac{\pi\left(1-\frac{\alpha}{90}\right)}{2\cos\alpha} - 1.$$

The error according to this formula is plotted for a few values of α in the following Table 1:

TABLE 1

| | α | ERROR IN % |
|---|---|---|
| Zenith: | 90° | 0% |
| | 80° | 0.5% |
| | 60° | 4.7% |
| | 45° | 11% |
| Horizon: | 0° | 57% |
| Southern Hemisphere | −45° | 233% |

One can show the distortions resulting from the transformation of a hemisphere on a flat, circular surface also by the resultant excess area created on the flat surface. If one plots on a radial map the fractional stretch, derived in the text and tabulated, one could construct a figure having a peaked curve that gets rapidly wider at the outer circle, the horizon. The stretch factor there is $\pi/2-1=0.57$, corresponding to the ratio of the 130° angle corresponding to the circumference of the spherical horizon, 360°−130°; 0.57=130°/230°. By eliminating the use of such a "cusp" area and crowding the constellations, freed from distortions by using gnomonic projections for them, one can create maps that provide less distortion at lower altitudes.

One of the disadvantages of opening up one large unoccupied cusp area is that the orientation of the constellations with respect to the directions of the compass is altered. Instead of this approach, one can spread out the unoccupied areas. The directions with respect to the compass are maintained, but the angular distance between stars across an empty divide is enlarged in the device over the angle in the sky. One must thus judiciously choose the unoccupied areas for each month and different latitudes, so that inside the constellations the conformal match is excellent and is very good between constellations.

In accordance with one implementation of a gnomonic map, constellations are first calculated and plotted, as in the traditional zenith projection, using the brightest star coordinates as determined by any standard reference, with the standard spherical transformation formulae for twelve sidereal times, one for each month. The "true" gnomic shape of the constellation, the shape it has on a plane, tangential to the celestial globe at the position of the constellation is then calculated and plotted. This calculation may be done by choosing a latitude and sidereal time on earth until the particular constellation was in the zenith. All of the constellations on the traditional zenith projection are then replaced by their gnomonic projections, ending up with what is referred to herein as a "gnomonically corrected zenith projection map."

Advantageously, a gnomonically corrected zenith projection map allows one to superimpose the real stars of a constellation quite closely with those on the map using the apparatus of the present invention. Also, since the radial error in the zenith projection is zero, one can truly find any constellation by starting at zenith. Due to the stretching errors, it generally is not possible in this projection to connect stars at different constellations in a tangential manner without error. However, this effect is not serious for stars far from the horizon. Although it may be more serious for stars just above the horizon, these stars often are not primary targets of attention since haze, atmospheric absorption, and obstacles often make these stars unobservable.

SUPPORT STRUCTURE 180

Support structure 180 supports magnifier 110 and map assembly 165. Support structure 180 also enables the observer selectively to position map assembly 165 (and thus map 170) with respect to magnifier 110. Further, support structure 180 may optionally house active illuminator 190 and its switch 192.

As shown in FIGS. 1A and 1B, support structure 180 includes focusing support member 130, map assembly mounting member 140, and active illuminator 190. Focusing support member 130 provides a mechanical coupling between magnifier 110 and map assembly 165. In the illustrated embodiment, focusing support member 130 also provides that the distance between magnifier 110 and map assembly 165 may be adjusted so that the focal plane of magnifier 110 falls approximately on map 170. Map assembly mounting member 140 holds map assembly 165 in place with respect to focusing support member 130.

Focusing Support Member 130

In the illustrated embodiment, focusing support member 130 is a hollow brass cylinder having threads on one end that match threads in threaded portion 120 of magnifier 110. On an opposing end, focusing support member 130 is soldered to map assembly mounting member 140. Thus, simply by rotating focusing support member 130 in relation to magnifier 110, and thus threading or un-threading these components with respect to each other depending on the directions of threading and rotation, the distance between magnifier 110 and map assembly mounting member 140 is varied. It will be understood that this arrangement is one of many types of adjustable couplings that may be employed in alternative embodiments. For example, magnifier 110 and focusing support member 130 may be slidably adjustable with respect to each other. That is, a portion of magnifier 110 may, for example, be a tube that is frictionally coupled, but slidable, within a cylindrical focusing support member 130 having an inside diameter slightly larger than the outside diameter of the tube portion of magnifier 110. Mechanical stops (not shown) may optionally be provided to ensure that magnifier 110 does not completely disengage from focusing support member 130, or otherwise to restrict the movement of the two components with respect to each other.

The interior diameter of focusing support member 130 is large enough so that light reflected from, or passing through, map 170 passes unobstructed into magnifier 110. The required dimension of this interior diameter depends upon the size of map 170, the optical characteristics of magnifier 110, and other factors that are well known to those skilled in the relevant art.

Map Assembly Mounting Member 140

As noted, map assembly mounting member 140 holds map assembly 165 in place with respect to focusing support member 130. Map assembly mounting member 140 need not be a separate component but may, in alternative embodiments, be integral with focusing support member 130. That is, it may be a flange of, or extrusion from, focusing support member 130 (generally referred to herein as being "integrated into" focusing support member 130). In the illustrated embodiment, map assembly mounting member 140 is a circular plate made of stainless steel that is soldered to focusing support member 130. It is evident that many other materials, and attaching techniques or materials, may be used in other embodiments. The central portion of map assembly mounting member 140 consists of a hole (or transparent material) so that light may pass through it, without obstruction or distortion, through focusing support member 130 and thence into magnifier 110. Advantageously, the hole may thus be circular, with a diameter approximately the same as the inner diameter of cylindrical focusing support member 130. In the illustrated embodiment, map assembly mounting member 140 is a circular steel plate having an outside diameter of approximately eight centimeters and having a hole in the center that has a diameter of two centimeters.

Map assembly mounting member 140 advantageously is made of steel in the illustrated embodiment so that map assembly 165 may be attached to it through the use of magnetic fields. As noted below, map attachment member 160 of the illustrated embodiment is a ring of permanently magnetized magnetic rubber. Alternatively, map assembly 165 may contain material that can be attracted by a permanent magnet. In that case map assembly 165 may include a steel ring, and mounting member 140 may be covered by a sheet of magnetized rubber. Any other material responsive to a magnetic field may also be used in other embodiments. Alternatively, map 170 may itself be magnetic and attached directly to map assembly mounting member 140. As noted, for the dimensions and optical characteristics of the illustrated embodiment of identifier 100, map assembly mounting member 140 may not be a complete cylinder, i.e., it may not have a completely circular upper and lower surface. Rather, a portion of it may be truncated so that it does not cross over into the field of view of the unaided eye. In the illustrative embodiment, for example, map assembly mounting member 140 is a disk having a diameter of about eight centimeters, except for the truncated portion that is made by a cut perpendicular to the radius of the disk at a distance of approximately 3.5 centimeters from the center. The edge of this truncated portion is shown as edge 142 in FIG. 1A. As is evident, the cut may be made at many other locations, and edge 142 need not be a straight line. Rather, it may be any shape and the truncated portion may have any dimensions or shape, provided that the surface of map assembly mounting member 140 in contact with map assembly 165 provides sufficient support to map assembly 165 so that it does not inadvertently become detached.

Active Illuminator 190

As noted, identifier 100 may be operated without an external light source, but merely using starlight to back light the transparent representational objects on map 170. However, should additional lighting be desired, a variety of active illuminators may be used. For example, map 170 may be backlit with a flashlight, a phosphorescent sheet, an electroluminescent panel, or through elements employing chemiluminescence. Alternatively, some or all of the representational objects on map 170 may be printed using phosphorescent paint rather than being transparent. It typically is required that such phosphorescent paint be "charged up" with light, allowing it to remain phosphorescent for a short time, e.g., about 15 minutes. The paint may then be "recharged" relatively quickly by applying light from a flashlight or other source.

In the illustrated embodiment, active illuminator 190 is a light emitting diode of any of a variety of known designs, including a switch 192. Active illuminator 190, switch 192, and a power source (such as a battery, not shown) may be mounted at any location where light from active illuminator 190 illuminates map 170 so that light is reflected off of it and back into magnifier 110, and so that these elements do not obstruct the path of light from map 170 to magnifier 110. For example, they may be mounted on an exterior wall of focusing support member 130, at a radial distance greater than the radius of threaded portion 120 of magnifier 110, as shown in FIG. 1B.

MAP ASSEMBLY 165

Map assembly 165 includes map 170 and map attachment member 160. Map assembly 165 holds map 170 and provides a convenient attachment of it to support structure 180. In particular, the illustrated embodiment enables the observer quickly to include map 170 in, or remove it from, map assembly 165. Also, as described below, map assembly 165, and thus map 170, may conveniently be translated and/or rotated with respect to magnifier 110 so that selected portions of map 170 may be magnified and presented to the observer.

Map Attachment Member 160

As noted, it typically is not advantageous to provide that magnifier 110 presents the observer with a single image encompassing an entire 180-degree field of view. Rather, it is desirable to provide that a number of smaller fields of view, for example, each encompassing a 45-degree range, be presented to the observer. As also noted, the entire sky may be encompassed in this manner by repositioning map 170 so that various 45-degree portions are sequentially magnified by magnifier 110 and presented to the observer.

In the illustrated embodiment, such sequential positioning is achieved by mounting map 170 on map attachment member 160, which is a magnetic ring. Map attachment member 160 has an internal diameter of the ring that is of sufficient size that the ring does not obstruct any portion of map 170 that the observer may wish to view. For example, map 170 may be drawn on a transparency having an area extending beyond the diameter of the circular map to provide a portion that may be attached, using any adhesive technique or material, to map attachment member 160. Alternatively, map attachment member 160 may be a ring that fits around the outer diameter of map 170 and is held into place by friction, by contracting forces within map attachment member 160, or in accordance with any of a variety of other known techniques. In the illustrated embodiment, map attachment member 160 is cut from a thin magnetized rubber sheet. To facilitate moving and rotating map 170 under magnifier 110, map 170 is glued onto map attachment member 160 at the perimeter of map 170. Thus, in the illustrated embodiment, map 170 is glued to map attachment member 160, which is magnetically attached to map assembly mounting member 140, which is soldered to focusing support member 130, which is threaded to accept magnifier 110. Alternatively, a thin transparent plastic foil may be glued to each side of ring 160, one foil being attached only to half of the ring's circumference. In this way map 170 may conveniently be inserted and taken out of map assembly 165. Also, the foil furthest from the observer may be translucent, instead of transparent, so that it diffusely scatters the incident star light.

The magnetic attachment of map assembly 165 to map assembly mounting member 140 is convenient because, as noted, it allows quick and easy detachment or movement. However, it will be understood that any of a variety of known techniques may be used in alternative embodiments to make this attachment. For example, clamps, strips of adhesive material, and many other fasteners could be used.

Having now described one embodiment of the present invention, it should be apparent to those skilled in the relevant art that the foregoing is illustrative only and not limiting, having been presented by way of example only. Many other schemes for distributing functions among the various functional elements of the illustrated embodiment are possible in accordance with the present invention. The functions of any element may be carried out in various ways in alternative embodiments, and functions described with respect to separate elements in the illustrated embodiment may be combined in one element in other embodiments. For example, numerous variations are contemplated in accordance with the present invention to provide support to the map; to mechanically couple the map to the magnifier, the map attachment member, the map assembly mounting member, or the focusing support member; to focus the magnifier so that its focal plane approximately corresponds to the plane of the map; to illuminate the representational objects on the map; to change the portion of the map visible to the observer through the magnifier; and so on. The magnifier may employ any of a large variety of optical elements, the specification of which is not material to the present invention. Similarly, a variety of types of conformal maps may be used, including, but not limited to, curved ones. Numerous other embodiments, and modifications thereof, are contemplated as falling within the scope of the present invention as defined by appended claims and equivalents thereto.

What is claimed is:

1. A conformal identification apparatus constructed and arranged to enable an observer to view through a first visual path at least first and second representational objects corresponding to at least first and second actual objects, comprising:

a map, including the first and second representational objects, disposed within the first visual path;

a magnifier, disposed within the first visual path, constructed and arranged to magnify a portion of the map including the first and second representational objects;

a support structure constructed and arranged to support the map and the magnifier;

wherein the apparatus further is constructed and arranged to enable the observer to view the first and second actual objects with respect to a second visual path simultaneously with viewing the magnified image with respect to the first visual path; and wherein the magnifier has a focal plane and has a magnification determined so that, when the map is positioned approximately at the focal plane, an angle between the first and second representational objects as observable with respect to the first visual path is approximately the same as an angle between the first and second actual objects as observable with respect to the second visual path.

2. The apparatus of claim 1, wherein the support structure further is constructed and arranged to enable the observer selectively to position the map approximately at the focal plane.

3. The apparatus of claim 1, wherein:

the magnifier includes one or more optical lenses.

4. The apparatus of claim 1, wherein:

the map has a size and shape that are determined so that, when positioned approximately at the focal plane and based on one or more set of typical human facial dimensions, the map does not obstruct the observer's observation of the first and second actual objects through the second visual path.

5. The apparatus of claim 1, wherein:

the map is approximately circular in shape and has a diameter in a range between approximately three centimeters and approximately seven centimeters.

6. The apparatus of claim 1, wherein:

the map has an opaque background and a transparent foreground including one or more transparent representational objects.

7. The apparatus of claim 1, wherein:

the map has one or more foregrounds, each including one or more passively illuminated representational objects.

8. The apparatus of claim 1, wherein:

the map has one or more foregrounds, each including one or more actively illuminatable representational objects.

9. The apparatus of claim 1, wherein:

the map has one or more foregrounds, one or more of which includes one or more passively illuminated representational objects and one or more actively illuminatable representational objects.

10. The apparatus of claim 1, wherein:

the map further includes one or more information marks.

11. The apparatus of claim 1, wherein:

the map is celestial.

12. The apparatus of claim 1, wherein:

the map is terrestrial.

13. The apparatus of claim 1, wherein:

the map conforms with a magnified image of one or more objects.

14. The apparatus of claim 1, wherein:

the support structure includes a focusing support member movingly coupled to the magnifier and coupled to the map.

15. The apparatus of claim 14, wherein:

the focusing support member is disposed between the magnifier and the map.

16. The apparatus of claim 15, wherein:

the focusing support member is aligned with the magnifier along a common axis and is spirally rotatable with respect to the magnifier about the common axis.

17. The apparatus of claim 16, wherein:

the magnifier and the focusing support member are correspondingly threaded.

18. The apparatus of claim 15, wherein:

the focusing support member is aligned with the magnifier along a common axis and is slidable with respect to the magnifier along the common axis.

19. The apparatus of claim 14, wherein:

the focusing support member is constructed and arranged to enable the observer to selectively position the map approximately at the focal plane.

20. The apparatus of claim 14, further including:

a map assembly including the map;

and wherein:

the support structure further includes a map assembly mounting member connected to the focusing support member, disposed between the focusing support member and the map assembly, and constructed and arranged to support the map assembly.

21. The apparatus of claim 20, wherein:

the map assembly mounting member is fixedly connected to the focusing support member.

22. The apparatus of claim 20, wherein:

the map assembly mounting member is integrated into the focusing support member.

23. The apparatus of claim 20, wherein:

the map assembly mounting member is rotatingly coupled to the focusing support member.

24. The apparatus of claim 20, wherein:

the map assembly further includes a map attachment member coupled with and disposed between the map and the map assembly mounting member.

25. The apparatus of claim 24, wherein:

the map attachment member is movably coupled to the map assembly mounting member.

26. The apparatus of claim 25, wherein:

the map is fixedly connected to the map attachment member; and the portion of the map is determined by moving the map attachment member with respect to the map assembly mounting member.

27. The apparatus of claim 24, wherein:

the map attachment member is rotatingly coupled to the map assembly mounting member.

28. The apparatus of claim 24, wherein:

the map attachment member is fixedly connected to the map assembly mounting member.

29. The apparatus of claim 24, wherein:

the map assembly mounting member is attracted by a magnetic field to the map assembly; and the map attachment member is magnetic.

30. The apparatus of claim 1, further comprising:

one or more active illuminators disposed between the magnifier and the map and supported by the support structure.

31. The apparatus of claim 1, wherein:

the apparatus is monocular.

32. The apparatus of claim 1, further comprising:

a beamsplitter disposed within the first visual path, and wherein the apparatus is binocular.

33. The apparatus of claim 1, wherein:

the map is curved.

34. The apparatus of claim 33, wherein:

the map is disposed on a surface of a representational sphere that is mirror-imaged left to right with respect to an actual sphere including the at least first and second actual objects.

35. The apparatus of claim 34, wherein:

the representational sphere is disposed to rotate around two axes so that each point on the sphere is positionable by rotation to be disposed within the first visual path.

36. A conformal identification apparatus, comprising:

magnifying means for magnifying a portion of a reference image that represents an actual image;

focusing means for varying the focal length of the magnifying means; and positioning means for varying the position of the reference image with respect to the magnifying means, wherein the magnified portion of the reference image, when presented to at least a first eye of an observer, is visually superimposed on the actual image as viewed simultaneously by the observer.

\* \* \* \* \*